Figure 1:
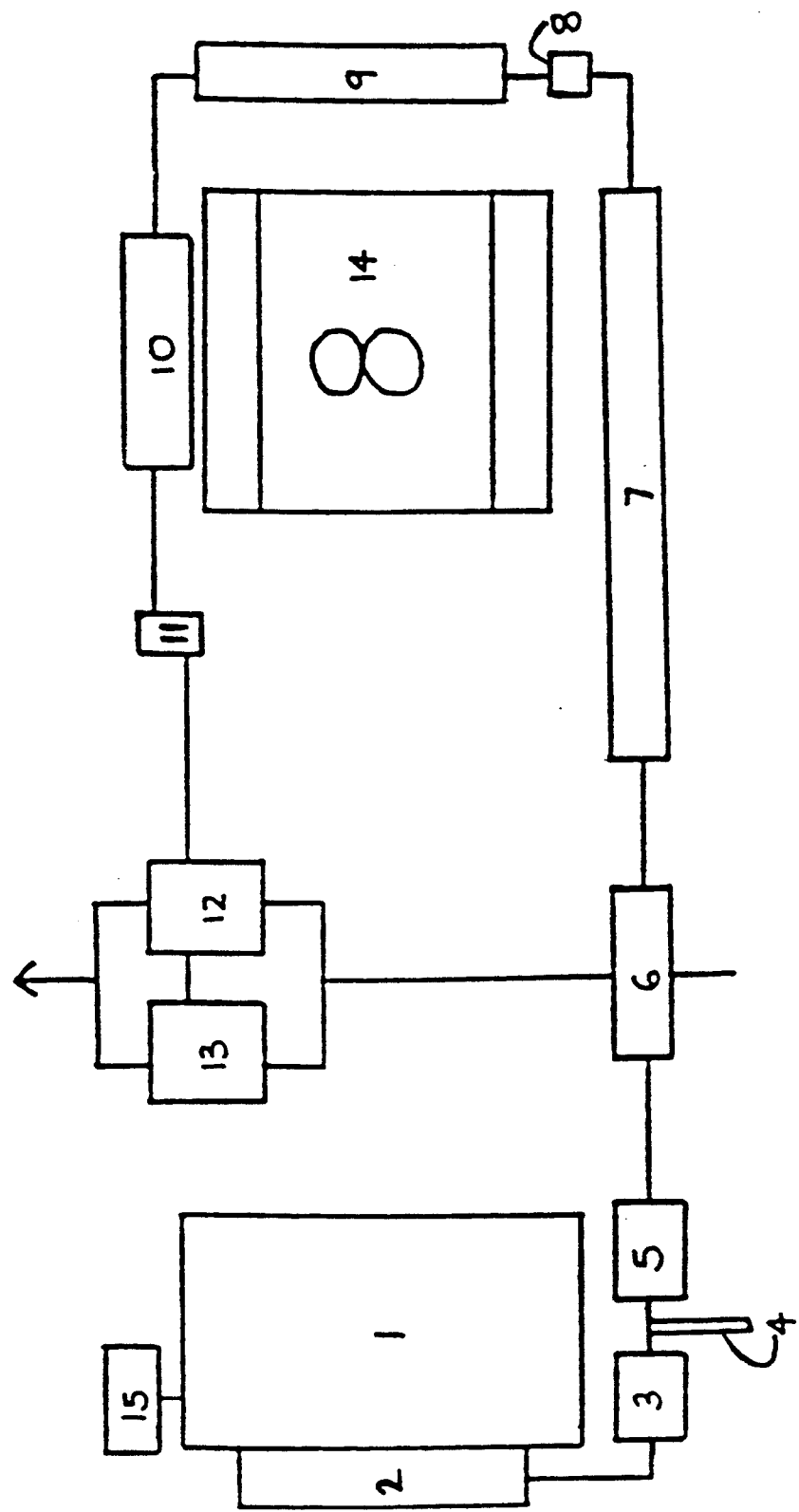

United States Patent [19]

Banks et al.

[11] Patent Number: 5,300,265
[45] Date of Patent: Apr. 5, 1994

[54] CONTROLLED ATMOSPHERE GENERATING EQUIPMENT

[75] Inventors: Henry J. Banks, Pialligo; Keith A. Norris, Frankston; Robert J. Symons, Wheelers Hill; Robert C. Whitlock, Frankston, all of Australia

[73] Assignee: Fluid Dynamics Pty Ltd., Frankston, Australia

[21] Appl. No.: 835,992

[22] PCT Filed: Jun. 26, 1990

[86] PCT No.: PCT/AU90/00273
§ 371 Date: Feb. 21, 1992
§ 102(e) Date: Feb. 21, 1992

[87] PCT Pub. No.: WO91/00018
PCT Pub. Date: Jan. 10, 1991

[30] Foreign Application Priority Data

Jun. 26, 1989 [AU] Australia .................. AU894910

[51] Int. Cl.⁵ .................................... B01D 50/00
[52] U.S. Cl. .................................... 422/172; 422/173; 422/194; 422/198; 60/309; 60/298
[58] Field of Search ........... 422/172, 173, 190, 194, 422/198, 200, 207; 60/279, 298, 321, 301, 309, 276, 274, 285; 55/33, 179; 423/213.7, 239; 34/36, 37, 86

[56] References Cited

U.S. PATENT DOCUMENTS

| | | | |
|---|---|---|---|
| 3,464,801 | 9/1969 | Barstow | 60/309 |
| 3,559,402 | 2/1971 | Stone et al. | 60/279 |
| 3,630,030 | 12/1971 | Wagner | 60/274 |
| 3,699,683 | 10/1972 | Tourtellotte et al. | 60/279 |
| 3,736,745 | 6/1973 | Karig | 60/279 |
| 3,842,600 | 10/1974 | Nakajima et al. | 60/301 |
| 3,927,526 | 12/1975 | Tedrow | 60/309 |
| 4,031,866 | 6/1977 | Asano | 60/276 |
| 4,312,641 | 1/1982 | Verrando et al. | 55/33 |
| 4,380,458 | 4/1983 | Callihan | 55/33 |
| 4,522,027 | 6/1985 | Hasegawa et al. | 60/274 |
| 4,630,975 | 12/1986 | Becker | 406/85 |
| 4,723,417 | 2/1988 | Meckler | 62/271 |

FOREIGN PATENT DOCUMENTS

| | | |
|---|---|---|
| 221856 | 5/1987 | European Pat. Off. |
| 60-070014 | 4/1985 | Japan |
| 62-100244 | 5/1987 | Japan |
| 356844 | 9/1931 | United Kingdom |
| 425903 | 6/1934 | United Kingdom |
| 1219098 | 1/1971 | United Kingdom |

Primary Examiner—Robert J. Warden
Assistant Examiner—Hien Tran
Attorney, Agent, or Firm—Seidel, Gonda, Lavorgna & Monaco

[57] ABSTRACT

An apparatus to produce a low oxygen containing gas in which exhaust gases from an engine are cooled by passing them through a manifold cooler. Harmful gases are removed by passing the exhaust gases through a catalytic converter for removal of NOX. Air in injected and the exhaust gas passed through a further catalytic converter for removal of CO. The exhaust gases are then cooled by passing them through an air to gas heat exchanger, and a series of water-cooled heat exchangers which are water-cooled and the resulting condensate removed by condensate drain. The water coolant is supplied by a closed circuit radiator system. The exhaust gases are then passed through a condensate screen and two filter beds for removal of moisture which may be regenerated by passing warm air derived from the air to gas heat exchanger through them when not in use. The operation of the system may be regulated by a fuel management system which includes an oxygen sensor.

33 Claims, 1 Drawing Sheet

CONTROLLED ATMOSPHERE GENERATING EQUIPMENT

FIELD OF THE INVENTION

The present invention relates to apparatus for the production of a low oxygen containing gas.

BACKGROUND OF THE INVENTION

Whilst the following description of the apparatus for generating a controlled atmosphere particularly refers to its application to grains and foodstuffs, the equipment has application to other areas where a controlled atmosphere is desired. For example, tobacco, feed stock, rice, fruit and metallurgical processing.

Storage of grains and foodstuffs has for a long time presented problems relating to maintaining the integrity of the grains and foodstuffs and reducing any degradation caused by foreign organisms. Studies of the degradation in the storage of grains and foodstuffs over a prolonged period have been carried out by the Commonwealth Scientific and Industrial Research Organisation ("C.S.I.R.O."). In particular an entomological study of the effects of foreign growths upon wheat and other grains has been reported. According to these reports, wheat and other grains are subject to attack from organisms which can cause spoilage of the stored grain. Further, these studies have also revealed that the quality of grains may degenerate over an extended period due to the effects of oxygen on the grains.

The studies of C.S.I.R.O. have also shown that storage of grain, in particular wheat, in an inert atmosphere, under conditions of reduced moisture and in particular minimized oxygen, results in foreign organisms becoming dormant and ultimately dying. It has also been reported that such inert atmosphere does not interfere with the nutritional value of the grain thus enabling it to be stored safely for prolonged periods. It has also been shown that moulding may be reduced and the germination level retained in such conditions.

STATEMENT OF THE INVENTION

Accordingly, it is an object of the present invention to provide an apparatus and method for generating a controlled atmosphere low in oxygen content in a storage container.

According to a first embodiment of the invention an apparatus is provided for producing an exhaust gas having a low oxygen content comprising:
  (i) means to combust a mixture of air and fuel to produce an exhaust gas containing $N_2$, CO, NOX, inert gases and small amounts of uncombusted $O_2$;
  (ii) at least one catalytic convertor means to substantially reduce the NOX and/or CO content in the exhaust gas;
  (iii) at least one heat exchange means to substantially reduce the temperature of the exhaust gas issuing from the at least one catalytic convertor; and
  (iv) an absorption system through which the exhaust gas passes to substantially reduce the moisture of the exhaust gas.

According to a second embodiment of the invention a method is provided for producing an exhaust gas having a low oxygen content comprising the steps of:
  (i) combusting a mixture air and fuel to produce an exhaust gas containing $N_2$, CO, NOX, inert gases and small amounts of uncombusted $O_2$;
  (ii) passing the exhaust gas through at least one catalytic convertor means to substantially reduce the NOX and/or CO content in the exhaust gas;
  (iii) passing the exhaust gas through a heat exchanger to reduce the temperature of the exhaust gas issuing from the at least one catalytic converter; and
  (iv) passing the exhaust gas through an absorption system to substantially reduce the moisture content of the exhaust gas.

PREFERRED EMBODIMENTS

Preferably, the means to combust a mixture of air and fuel is an internal combustion engine, pulse jet engine or gas turbine engine. More preferably the means should be capable of combusting propane.

In another preferred embodiment the apparatus additionally comprises at least one additional heat exchange means between the means to combust a mixture of air and fuel, and the at least one catalytic converter means, to reduce the temperature of the exhaust gas. For example, the additional heat exchange means is a water-cooled manifold. Other examples are a water to gas heat exchanger and an air to gas heat exchanger.

In another preferred embodiment the catalytic converter means comprises:
  (i) a first catalytic converter section to substantially reduce NOX in the exhaust gas;
  (ii) a second catalytic converter section to substantially reduce CO in the exhaust gas; and
  (iii) air injection means to introduce air into between the first and second catalytic converter section to enhance the reduction of CO in the exhaust gas.

Typically the first catalytic converter section consists of two catalytic chambers.

The air injection means may include an air line from a modified petrol vacuum pump and a flow meter to monitor the volume of air injected between the first and second catalytic section.

In further preferred embodiments of the invention the absorption system can take on a number of arrangements. For example, it may include means to collect and/or remove moisture from the exhaust gas. Typical of these is a condensate knock-out means, and a condensate drain tank. If a condensate drain tank is selected it may include a submerged automatic drain which maintains a liquid seal with the atmosphere.

Alternatively or additionally the means to collect and/or remove the moisture from the exhaust gas may be a desiccant, e.g. wheat. In this arrangement the system may comprise:
  (i) a first absorbent chamber containing a desiccant;
  (ii) a second absorbent chamber containing a desiccant;
  (iii) means to direct the exhaust gas to the first absorbent chamber until the first absorbent chamber has absorbed a predetermined amount of moisture from the exhaust gas;
  (iv) means to thereafter direct the exhaust gas to the second absorbent chamber until the second absorbent chamber has absorbed a predetermined amount of moisture; and
  (v) means to regenerate the desiccant in the first or second absorbent chamber with warm regenerative air to reduce the moisture content of the desiccant.

Preferably the warm regenerative air is supplied from the additional heat exchanger means.

To enhance the operation of the apparatus it is desirable to include:

(i) sensor means to sense and measure oxygen in the exhaust gas issuing from the absorption system; and (ii) means to control and adjust the mixture of air and fuel, in response to the sensor means.

Typically the apparatus produces an exhaust gas containing nitrogen (typically greater than 80%), carbon dioxide (typically 10%-14% depending on fuel composition) and steam with only trace amounts of oxygen (e.g. less than 0.5% oxygen), less than 5 ppm NOX (oxides of nitrogen) and less than 50 ppm carbon monoxide.

The issuing exhaust gases should preferably not increase the moisture content of the container into which it is fed and therefore those gases are preferably treated, as indicated, in the additional heat exchanger so as to remove substantially all the moisture content.

The removal of moisture from the exhaust gases (and the controlling of gas quality) may be conveniently achieved by passing the exhaust gas from the engine via a water-cooled manifold to a catalytic converter. As the temperature of the gases issuing from the converter is very high, it is preferred to pass these through water to gas or air to gas heat exchangers. Cooling water may be supplied to these heat exchangers from the circulation of water achieved by a conventional water pump through a cooling radiator. Thus, a closed circuit heat exchanger can be provided to cool the exhaust gases from the engine. Of course, a closed circuit is not essential and the heat exchange medium could be removed as waste.

As indicated, preferably, the catalytic conversion is carried out using two catalyst sections. The first catalyst section consists of two catalytic chambers. In this embodiment, after the first catalyst section, air is injected at a controlled rate prior to the second catalyst section. The air injection is taken by an air line off a modified petrol vacuum pump designed to inject low pressure air, via a flowmeter, to an injection point between the first and second catalyst sections.

The amounts of low pressure injection air may need variable control to cover the range of engine revolutions envisaged for the purge and top-up phases of the gas generator. This double catalyst section, with intermediate low pressure controlled air injection system, has been found to control the harmful exhaust gases NOX and CO to less than the required maximum allowable parts per million limits. It has been found desirable in the first catalyst section to use two catalytic chambers to ensure that NOX gas is controlled at acceptable levels.

The cooling of the exhaust gases generates condensate. This is drained off continuously into a condensate drain tank.

As also previously indicated to further reduce the moisture content of the exhaust gases, it is preferred to pass the gases through a water absorption system. Specifically for wheat storage systems the water absorption system will consist of wheat filters, using wheat as the absorbent, or alternative desiccants if necessary. Wheat has been found to be most successful not only as a moisture absorber but also as a final remover of other pollutants prior to injection into the wheat storage system.

A tandem wheat regeneration system may also be incorporated using an air to gas heat exchanger to give warm regenerative air to the off line absorber. This changeover system is designed to ensure that both filters are maintained in effective working condition. Filter beds are also dried out using the regeneration system prior to machine shut down. Special two way rubber sealed, spring loaded flap valves have been specifically designed to be hydraulically operated on this loose link changeover system, as they were not commercially available.

It has also been proved that the absorber-regenerator system needs a counter flow arrangement of gas in at the bottom, whilst hot air regeneration inlet is at the top of the beds.

When the controlled atmosphere machine is used on other storage mediums, alternative desiccants may be used.

Additional condensate knock-out facilities have been built into the filter cans. Condensate so removed also drains back to the condensate tank. The condensate tank includes a submerged automatic drain valve to maintain a liquid seal to the atmosphere.

In a further preferred embodiment of the invention, where the amount of oxygen in the exhaust gas is to be minimized, close control of the combustion of the fuel (e.g. liquid petroleum gas or LPG) and air is desired. As will be readily appreciated, combustion of LPG to oxygen in proper stoichiometric ratio will theoretically achieve a minimum amount of oxygen and unburnt hydrocarbon and other products of partial combustion issuing in the exhaust gases. To achieve this close control it is desirable to locate an oxygen sensor in the exhaust stream and provide electronic circuitry connected to this and to an air/fuel ratio controller to adjust the air/fuel ratio to minimise the oxygen content in that exhaust stream. Oxygen sensors are well known and readily available. However, it has been necessary to utilize an air/fuel ratio controller which is simple and adapted to quickly respond to changes in the sensed oxygen content in the exhaust stream. One such suitable air/fuel ratio controller is sold under the trade mark IMPCO.

Air/fuel ratio control is carried out by extremely fine control on fuel in conjunction with pre-set engine revs and air volume. A low pressure air injection system is taken off the regenerative air blower line, and injected at constant pressure and volume for any pre-set engine speed. This injection system gives the engine consistent conditions for stoichiometric combustion, irrespective of continual changes of atmospheric conditions, barometric pressure, and wind effects.

Controlled combustion air then allows for controlled fuel injection. The fine fuel injection is effected mechanically by the motorised movement of a specifically tapered needle inside an orifice.

Noise levels from the machine are to be kept at a minimum. In addition to normal sound attenuation procedures, wherever possible all noise generating items have been designed to direct noise vertically up from the gap generator.

DESCRIPTION OF THE INVENTION

The present invention will now be further described with reference to the accompanying drawings in which:

FIG. 1 is a flow diagram of an apparatus according to the invention.

As shown, an engine 1 is provided, which may be an internal combustion engine or a pulse generator, small turbine or other combustion device.

The engine supplies exhaust gases and a source of power, either mechanical, electrical or hydraulic, to drive fans, blowers and compressors, and the electrical requirements of the engine (not shown).

Exhaust gases issue from the engine and pass via a manifold cooler 2 to the catalyst package.

The catalyst package has two catalytic converters 3 and 5. Air may be injected via an air injection system 4 between the two catalysts to control the products of combustion within satisfactory limits.

The exhaust gases then pass through a series of heat exchangers. The first is an air to gas heat exchanger 6 which provides an initial cooling to the exhaust gases. Further cooling is achieved by passing the exhaust gases subsequently through water-cooled heat exchangers 7, 9 and 10. The water coolant is supplied to heat exchangers 7, 9 and 10 from a closed circuit radiator system 14. Interposed between heat exchanger 7 and heat exchanger 9 is a condensate drain 8. Condensate drain 8 removes condensate during the gas cooling flow path, reducing the moisture content of the exhaust gases. The cooled exhaust gases issuing from heat exchanger 9 enter another heat exchanger 10 to further reduce the temperature of the exhaust gases.

Finally, the exhaust gases are passed into a condensate knock-out screen 11 built into the filter cans and through two filter beds 12 and 13. The filter beds are wheat filters which reduce the moisture content of the exhaust gases. These filter beds may be regenerated by passing warm air derived from the air to gas heat exchanger 6 through them when not in use.

The system's operation is regulated by a fuel management system 15. This system 15 includes an oxygen sensor located in the issuing gas from the apparatus and interacts with the air/fuel controller to regulate the air/fuel ratio in the combustion chamber of the engine to minimise the oxygen content of the exhaust stream.

The apparatus of the present invention is relatively simple and is capable of maintaining the required atmosphere for an extended length of time. Typically the exhaust gas which is fed to a foodstuff containing area comprises the following composition:

86% nitrogen
12.8% carbon dioxide
1.1% argon
0.1% oxygen
<5 ppm NOX
<50 ppm carbon monoxide The close control of the air to fuel mixture enables a constant steady load to be applied to the engine.

The use of this apparatus which runs on relatively cheap fuel avoids the need to introduce chemicals to treat stored foodstuff material and has been found to provide an exhaust which has a very low oxygen content thereby acting as an insecticide to the foodstuff by killing pest infestation such as *Cryptoleses ferrugineus*.

The apparatus is adapted to be transportable and self-contained though can be readily integrated with other power sources.

EXAMPLE 14 kg/hr of propane fuel was burnt in a modified LPG fixed spark ignition internal combustion engine. 170 m³/hr of exhaust gas was produced which comprised <0.5% oxygen, ppm NOX, unburnt fuel, CO and inert gases. The temperature of the gas was 300-400 degrees Celsius.

The exhaust gas was cooled by 50-100 degrees Celsius by passing through a custom made water-cooled manifold similar in design to a marine engine water-cooled manifold.

The gas which was at least 300 degrees Celsius was then passed through two fuel rich catalytic converters comprising Nissan Part No. 20802-J7100 for removal of NOX through the following typical reaction:

$$2NOX + 2XCO = 2XCO_2 + N_2$$

Sufficient air was injected into the exhaust gas at a low controlled pressure prior to entering a platinum based catalyst for removal of CO through the following typical reactions:

$$2CO + O_2 = 2CO_2$$

$$C_3H_3 + 5O_2 = 3CO_2 + 4H_2O$$

The temperature of the issuing gas was 300 degrees Celsius.

The temperature of the exhaust gas was reduced from 300 degrees Celsius to 45 degrees Celsius by passing the exhaust gas through a series of water to gas heat exchangers.

The cooling water was supplied to the water to gas heat exchangers from an air to water radiator in a closed loop. The radiator configuration was a twin bank vertical radiator module.

The radiator air was supplied by a hydraulically driven axial fan mounted above the radiator to create an induced draft with exhaust air vertically upwards resulting in fan noise being directed vertically upwards.

Up to 10 l/hr of condensate generated by the reduction of temperature in the exhaust gas was drained off via condensate drain tanks.

Much of the remaining condensate and pollutants was absorbed using a tandem wheat regeneration system with wheat as the absorbent. The moisture contents before and after were not recorded. The conditions of absorption were a gas flow just above ambient temperature and pressure. An air to gas heat exchanger was incorporated to give warm regenerative air to the off line absorber. This regeneration system was designed to ensure that both filters were maintained in effective working condition. Filter beds were also dried out using the regeneration system prior to the machine being shut down. Special two-way rubber-sealed spring-loaded flap valves were specifically designed to be hydraulically operated on the loose link regenerator or changeover system. The changeover system required a counterflow arrangement of gas at the bottom whilst the hot air regeneration was at the top of the filter beds.

The claims defining the invention are as follows:

We claim:

1. An apparatus for producing an exhaust gas having a low oxygen content comprising:
   (i) means to combust a mixture of air and fuel to produce an exhaust gas containing $N_2$, CO, NOX and small amounts of uncombusted $O_2$;
   (ii) at least one catalytic converter means to substantially reduce the NOX and/or CO content in the exhaust gas;
   (iii) at least one heat exchange means to substantially reduce the temperature of the exhaust gas issuing from the at least one catalytic converter means;
   (iv) an absorption system through which the exhaust gas passes to substantially reduce moisture content of the exhaust gas, said absorption system comprising a regeneratable desiccant; and (v) means for subjecting the desiccant to heat energy from a stream of air to regenerate the desiccant to reduce the moisture content of the desiccant, the heat energy from the stream of air being the sole form of energy employed for regenerating the desiccant, and wherein following combustion of the air and fuel mixture, the exhaust gas passes through, in turn, the catalytic converter means, the heat exchange means and the absorption system.

2. The apparatus according to claim 1 wherein the means to combust a mixture of air and fuel is an internal combustion engine, pulse jet engine or gas turbine engine.

3. An apparatus according to claim 1 additionally comprising at least one additional heat exchange means between the means to combust a mixture of air and fuel and the at least one catalytic converter means, to reduce the temperature of the exhaust gas.

4. An apparatus according to claim 3 wherein the at least one additional heat exchange means is a water-cooled manifold.

5. An apparatus according to claim 3 wherein the at least one additional heat exchange means comprises a water to gas heat exchanger or an air to gas heat exchanger.

6. An apparatus according to claim 1 wherein the at least one catalytic converter means comprises:
 (i) a first catalytic converter section to substantially reduce NOX in the exhaust gas;
 (ii) a second catalytic converter section to substantially reduce CO in the exhaust gas; and
 (iii) air injection means to introduce air into and between the first and second catalytic converter sections to enhance the reduction of CO in the exhaust gas.

7. An apparatus according to claim 6 wherein the first catalytic converter section consists of two catalytic chambers.

8. An apparatus according to claim 6 wherein the air injection means includes a modified petrol vacuum pump and an air line connected thereto.

9. An apparatus according to claim 8 wherein the air injection means further includes a flow meter to monitor the volume of air injected between the first and second catalytic converter sections.

10. An apparatus according to claim 1 wherein the at least one heat exchange means is an air to gas heat exchanger or a water to gas heat exchanger.

11. An apparatus according to claim 10 wherein the at least one heat exchange means is the water to gas heat exchanger supplied with water cooled by circulation through a cooling radiator.

12. An apparatus according to claim 1 wherein the absorption system further comprises a condensate screen.

13. The apparatus according to claim 1 wherein the absorption system further comprises means to collect and/or remove moisture from the exhaust gas.

14. An apparatus according to claim 13 wherein the means to collect and/or remove moisture comprises a condensate drain tank.

15. An apparatus according to claim 14 wherein the condensate drain tank includes a submerged automatic drain which maintains a liquid seal with the atmosphere.

16. An apparatus according to claim 1 wherein the absorption system comprises:
 (i) a first absorbent chamber containing a desiccant;
 (ii) a second absorbent chamber containing a desiccant;
 (iii) means to direct the exhaust gas to the first absorbent chamber until the first absorbent chamber has absorbed a predetermined amount of moisture from the exhaust gas;
 (iv) means to thereafter direct the exhaust gas to the second absorbent chamber until the second absorbent chamber has absorbed a predetermined amount of moisture; and
 (v) means to direct the stream of air to the first or second absorbent chamber to regenerate the desiccant.

17. An apparatus according to claim 16 wherein the desiccant is wheat.

18. An apparatus according to claim 17 in which the means for subjecting the desiccant to heat energy from the stream of air to regenerate the desiccant receives the heat energy from the at least one heat exchange means.

19. An apparatus according to claim 1 further comprising:
 (i) sensor means to sense and measure oxygen in the exhaust gas issuing from the absorption system; and
 (ii) means to control and adjust the mixture of air and fuel in response to the sensor means.

20. An apparatus according to claim 1, wherein the at least one heat exchange means is a water to gas heat exchanger.

21. An apparatus according to claim 1, wherein the means for subjecting the desiccant to heat energy from the stream of air to regenerate the desiccant receives the heat energy from the at least one heat exchange means.

22. An apparatus according to claim 1, wherein the desiccant is a grain material.

23. An apparatus according to claim 22 wherein the desiccant is wheat.

24. A method for producing an exhaust gas having a low oxygen content comprising the steps of:
 (i) combusting a mixture of air and fuel to produce an exhaust gas containing $N_2$, CO, NOX and small amounts of uncombusted $O_2$;
 (ii) passing the exhaust gas through at least one catalytic converter means to substantially reduce the NOX and/or CO content in the exhaust gas;
 (iii) passing the exhaust gas from step (ii) through a heat exchanger to reduce the temperature of the exhaust gas issuing from the at least one catalytic converter means;
 (iv) passing the exhaust gas from step (iii) through an absorption system comprising a regeneratable desiccant to substantially reduce moisture content of the exhaust gas; and
 (v) regenerating the desiccant in the absorption system by subjecting the desiccant to heat energy from a stream of air, the heat energy from the stream of air being the sole form of energy employed for regenerating the desiccant.

25. A method according to claim 24 wherein the mixture of air and fuel in step (i) is the mixture of air and propane.

26. A method according to claim 24 comprising the additional step of passing the exhaust gas from step (i) through an additional heat exchanger to reduce the temperature of exhaust gas prior to passing the exhaust gas into step (ii).

27. A method according to claim 24 wherein step (ii) includes:

(a) passing the exhaust gas through a first catalytic converter section to substantially reduce NOX in the exhaust gas;
(b) injecting air into the exhaust gas issuing from step (a); and
(c) passing the exhaust gas and air mixture into a second catalytic converter section to substantially reduce CO in the exhaust gas.

28. A method according to claim 27 wherein the air injected into the exhaust gas in step (b) is metered according to predetermined conditions to allow the substantial reduction in CO in step (c) thereafter.

29. A method according to claim 24 wherein step (iv) includes the steps of:
(a) passing the exhaust gas from step (iii) into a first absorbent chamber containing a desiccant until the desiccant has absorbed a predetermined amount of moisture from the exhaust gas; and
(b) redirecting the exhaust gas from step (iii) thereafter to pass into a second absorbent chamber containing a desiccant until the desiccant has absorbed a predetermined amount of moisture from the exhaust gas from step (iii);
and wherein step (v) includes the step of
alternatively regenerating the respective desiccant of the first and second absorbent chambers when not in use with the regenerative stream of air to reduce the moisture content of the respective desiccant.

30. A method according to claim 29 wherein the heat energy from the regenerative stream of air is produced by heat exchange in the heat exchanger of step (iii).

31. A method according to claim 24, wherein the stream of air for regeneration of the desiccant is at a temperature of less than 100° C.

32. A method according to claim 24, wherein the desiccant is a grain material.

33. A method according to claim 32, wherein the desiccant is wheat.

* * * * *